Figure 1:
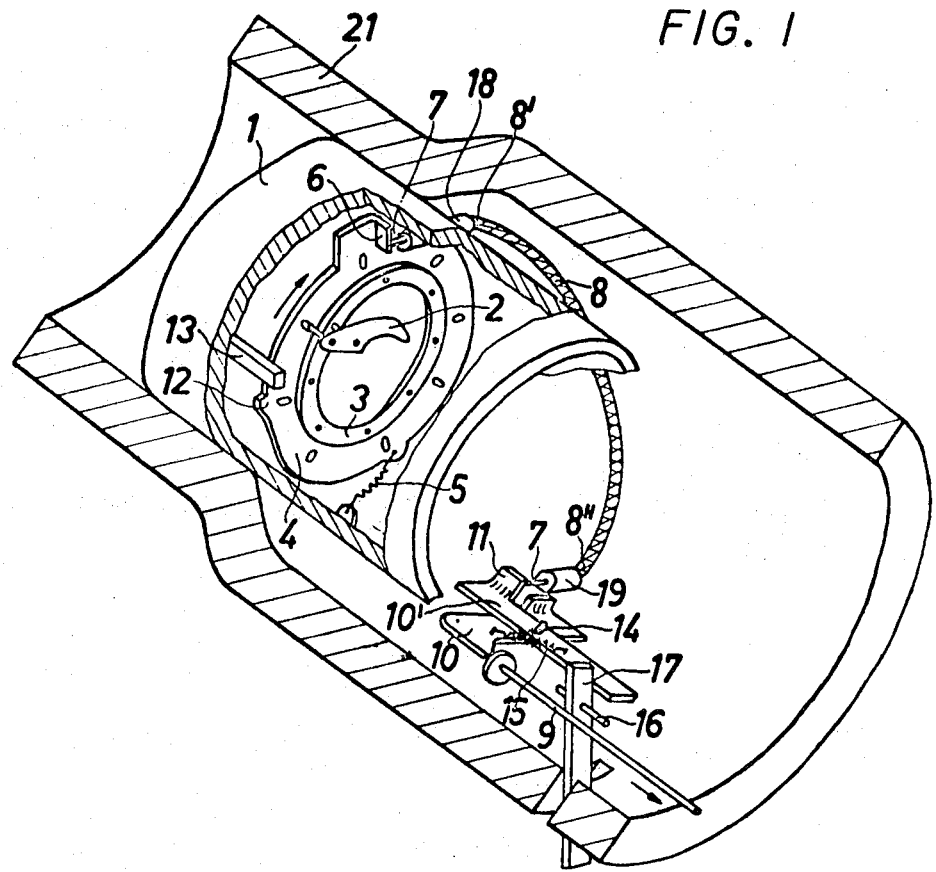

United States Patent [19]
Klupsch et al.

[11] 3,780,636
[45] Dec. 25, 1973

[54] DEVICES FOR OPERATING A SPRING AND PRESSURE CONTROLLED PRESELECTION DIAPHRAGM IN PHOTOGRAPHIC LENS MOUNTS

[76] Inventors: Paul Klupsch, 23, Am Johannisberg; Rudolf Paul, 14, Thomas-Mann-Strasse; Ulrich Dressler, 6, Geleitsstrasse, all of Jena, Germany

[22] Filed: Mar. 11, 1969
[21] Appl. No.: 806,325

[52] U.S. Cl. ............... 95/64 R, 95/64 A, 95/64 B
[51] Int. Cl. .............................................. G03b 9/02
[58] Field of Search ............... 95/64 A, 64 B, 64, 95/64 X

[56] References Cited
UNITED STATES PATENTS

| 2,334,075 | 11/1943 | Davenport | 95/64 A |
| 3,344,726 | 10/1967 | Weller | 95/64 A |
| 3,169,464 | 2/1965 | Koppen | 95/64 A |
| 2,986,981 | 6/1961 | Planert et al. | 95/64 B X |
| 2,751,828 | 6/1956 | Wirgin | 95/64 |

Primary Examiner—Samuel S. Matthews
Assistant Examiner—Russell E. Adams, Jr.
Attorney—Nalte and Nalte

[57] ABSTRACT

A photographic lens mount includes a spring and pressure controlled preselection diaphragm which participates in the focusing motion along the optical axis, a Bowden cable, and means for actuating the diaphragm. Part of the actuating means projects from the lens mount into the camera. The Bowden cable connects the actuating means with the diaphragm and controls the diaphragm setting by push and pull.

2 Claims, 2 Drawing Figures

PATENTED DEC 25 1973 3,780,636

DEVICES FOR OPERATING A SPRING AND PRESSURE CONTROLLED PRESELECTION DIAPHRAGM IN PHOTOGRAPHIC LENS MOUNTS

This invention relates to devices for operating spring and pressure controlled preselection diaphragms in photographic lens mounts. In known devices of that kind, various lever systems operatively connected to the shutter release of the camera, influence the setting of the diaphragm irrespective of the axial displacement of the diaphragm in the process of focusing. The same purpose is served by a system of transmission levers in the mount which are provided with sliding edges or slide extensions.

Devices of the foregoing kind have the disadvantage that tilting and friction moments, play in the bearings, complicated mechanical setup, and movement of too great masses go far to imperil the reliability and accuracy of the lens, particularly if there is considerable axial displacement of the diaphragm.

The present invention aims at increasing the working reliability and decreasing the complexity of spring and pressure controlled preselection diaphragms, particularly such diaphragms as are axially displaced during the focusing operation, by reducing to a minimum the masses required for operating the diaphragm and the friction and tilting moments due to diaphragm displacement.

To this end, the present invention consists of a device for operating a spring and pressure controlled preselection diaphragm in photographic lens mounts, the diaphragm participating in the focusing motion along the optical axis, wherein a diaphragm actuating means projecting from the mount into the camera is connected with the diaphragm by means of a Bowden control cable which responds to tension and pressure regardless of the diaphragm displacement along the optical axis.

Advantageously, the conduit of the Bowden control cable is a flexible tube which winds around the focusing member at a small distance therefrom and the two ends of which are respectively secured to the lens mount and the focusing member. Alternatively, the conduit of the Bowden control cable may be a tubular body of C shaped cross-section the open side of which faces, or faces away from, the optical axis.

Figure 2:
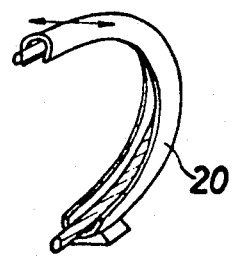

In order that the invention may be more readily understood, reference is made to the accompanying drawing which illustrates the invention diagrammatically and by way of example, and in which FIG. 1 is a lens mount including a focusing member, a Bowden control cable and the diaphragm release, and FIG. 2 is part of a Bowden control cable sheathed in a flexible conduit of approximately semi-circular cross-section.

In the drawing, a lens mount 21 houses a focusing member 1 which is secured against torsion and includes a stationary diaphragm between two lens elements (not shown). The diaphragm comprises leaves 2 (only one shown), a non-rotatable leaf guide ring 3, and a slotted disc 4 for diaphragm adjustment. A tension spring 5 tends to rotate the disc 4 clockwise (as shown in the drawing), so as to set the diaphragm at its minimum value. This rotation is however impeded by a stop 6 on the disc 4, which is urged into contact with the one end of a cable 7 of a Bowden 8 and, as shown in FIG. 1, keeps the diaphragm at its maximum value.

When the shutter of the camera is released, a pin 9 protruding from the part of the mount next to the camera housing is so disengaged by means not shown in the drawing as to be displaced towards the camera in the direction of the arrow. The motion of the pin 9 is followed by that of a lever 10, 10' in the form of a T, which is operatively connected with the spring 5 through a plate 11 fast with the lever arm 10', the cable 7, the stop 6 and the disc 4. Accordingly, the disc 4 is displaced in the direction of the arrow until a lug 12 lies against a variable stop 13 set to correspond to the preselected value, to which the diaphragm is thus reduced. When a photograph has been taken, means in the camera (not shown) restore the pin 9 automatically against the direction of the arrow to the position illustrated in the drawing, and the diaphragm reassumes its maximum value.

The lever arms 10 and 10' are so attached to one another by a pin 14 and a tension spring 15 as to be mutually at right angles. Possible too great deflection is compensated by the spring 15, an expansion of this spring causing a respective alteration of the angle between 10 and 10'. A two-arm lever 17 fulcrums about an axle 16 and protrudes from the focusing member 1. When switched by hand in the direction of the arrow, the lever 17 acts on the lever 10, 10' in such a manner that the Bowden cable 7 sets the diaphragm at the preselected value, the spring 15 causing the arm 10' to rotate without the arm 10, which is prevented by the pin 9. Thus the operator, when pressing against the lever 17, is enabled to view through the camera and objective, and thereby to examine the depth of field corresponding to the pre-selected diaphragm aperture.

The two ends 8' and 8'' of the Bowden 8 are respectively held in bearings 18 and 19, the bearing 19 being secured to the mount 21.

The Bowden control cable shown in FIG. 2 is sheathed in a flexible conduit 20 of approximately semi-circular cross-section. The conduit 20 winds around the focusing member 1 at a small distance therefrom and its ends are respectively secured to the focusing member 1 and the mount 21. The flexibility of the conduit 20 enables the focusing member 1 to move without hindrance, so that the diaphragm can be operated irrespective of focusing adjustment.

We claim:

1. A device for operating preselector means in the lens mount of a photographic camera, comprising: a lens focusing and preselector diaphragm holding means, longitudinally displaceable within the lens mount; an actuating means extending into and from the lens mount at a location spaced from the displaceable lens focusing and diaphragm holding means; and a Bowden cable for controlling the aperture of the preselector diaphragm, said cable being entirely disposed within the lens mount, one end of said cable being attached to the inner end of said actuating means and the other, to the lens focusing and diaphragm holding means, so that the other end of said cable can participate in the displacement of the lens focusing and diaphragm holding means but the cable cannot be contacted from the outside of the camera except through said actuating means.

2. A device as described in claim 1 wherein the preselector diaphragm is spring controlled and said cable provides means adapted to release the spring.

* * * * *